United States Patent Office

3,830,776
Patented Aug. 20, 1974

3,830,776
PARTICULATE FLY ASH BEADS
Jon R. Carlson and William P. Banks, Ponca City, Okla., and Rodney L. Flood, Allen, Tex., assignors to Continental Oil Company, Ponca City, Okla.
No Drawing. Original application Aug. 31, 1971, Ser. No. 176,691, now abandoned. Divided and this application July 2, 1973, Ser. No. 376,006
Int. Cl. C08g 51/04
U.S. Cl. 260—37 EP      3 Claims

ABSTRACT OF THE DISCLOSURE

Fly ash beads having a specific gravity of less than about 1.25 as separated into fractions having particular properties as particulate filler and substrate.

BACKGROUND

Field of the Invention

This invention relates to particulate filler and substrate. More particularly, this invention relates to spherical particulate filler smaller than 500 micron diameter, and especially to the utilization of certain fly ash fractions.

This application is a divisional of copending application Ser. No. 176,691, filed Aug. 31, 1971, now abandoned. Benefit of said application is claimed herein and said application is incorporated by reference herein.

Fly ash is a byproduct from the turbulent combustion of pulverized coal. Fly ash having a specific gravity of about 2.5 or higher is removed from the combustion chamber in the stack gases. Fly ash contains carbon, magnetically separable particles, and ceramic particles having a broad random distribution by size and specific gravity.

Description of the Prior Art

Known particulate filters of less than 500 micron size include glass microspheres, expanded graphite, metal powder, metal oxides, and fly ash generally. Glass microspheres have been used in compositions such as plastics, polymers, paints, ceramics, and as substrates for metal coatings. Expanded graphite, metal powder, and metal oxides have also been used in such compositions. The high cost and low crush resistance of glass microspheres make them impractical as a particulate filler for many uses. The cost, reactive nature, and particular properties such as electrical properties, low crush resistance and absorbency of each of the fillers limit their utility. Fly ash has been suggested as a replacement for glass microspheres in concrete, ceramics and similar compositions. Lack of uniformity of size, density, electrical properties and crush resistance and high specific gravity have prevented the general acceptance of fly ash as a particulate filler.

SUMMARY OF THE INVENTION

By this invention certain fly ash beads having a specific gravity of less than 1.25 are separated from fly ash by selective flotation of the light particles using a liquid media. It has been discovered that these fly ash beads, especially certain fractions of these beads, have a highly uniform distribution by color, particle size, gravity and other unexpected properties. These beads exhibit unexpected high crush resistance, good electrical insulation properties, good thermal insulation properties, and good acoustical characteristics as particulate filler or substrate in the compositions of this invention. Thus, limitations on the use of fly ash have been overcome and unexpected properties have been discovered for fly ash bead fractions by this invention.

Compositions of these fly ash beads in certain binders exhibit good crush resistance when fabricated into a shaped object or when applied as a coating to objects such as wood, masonry or other structural surfaces. In addition, certain of these objects have properties similar to wood. They can be nailed, cut, and sawed. They have a wood-like texture, appearance, density and thermal properties without being sensitive to moisture. Compositions of this invention exhibit unique electrical, thermal, and acoustical properties, which can be fabricated into rigid insulating shapes or aggregates by sintering or using a polymeric binder. They may be suspended in insulating fluid to provide excellent electrical, thermal and moisture insulation barriers.

Fly ash beads of this invention provide particulate substrate of uniform size and density that can be coated with a uniform metallic film by any of several well-known methods. Such metallically coated beads are essentially lightweight metallic spheres which are lightweight, reflective, electrically and thermally conductive particles. Such beads can also be used as filler or catalytic particles. They can easily be sintered to form porous permeable structures at a temperature substantially below that required to sinter ceramic particles.

DESCRIPTION OF PREFERRED EMBODIMENTS

According to this invention there is provided a composition consisting essentially of fly ash beads of about 20–300 micron diameter and a specific gravity of up to about 1.25 in a polymeric media. The fly ash beads of this invention are relatively chemically inert and are relatively non-magnetic so that polymeric compositions of this invention have not only good appearance but excellent chemical and electrical properties for structural and insulating compositions.

Preferred fractions of the fly ash beads of this invention consists of beads having particle size between about 50–100 microns and 100–200 microns which have been selected by gravity flotation using a fluid. The first group provides particulate filler having a mean specific gravity in the range of about 0.6–0.8 and a generally uniform particle size distribution skewed toward lighter particles both in specific gravity and color. The second group provides particulate filler having an average specific gravity below about 0.6.

This invention also provides a fluid insulating composition consisting essentially of about 5–80 percent by weight fly ash beads of about 20–200 micron diameter and a specific gravity of up to about 1.25 in an insulating fluid.

This invention also provides a lightweight metallic particle consisting essentially of a fly ash bead of about 20–300 micron diameter and a specific gravity of up to about 1.25 bearing a uniform and metallic coating.

Furthermore, this invention provides in a liquid coating composition selected from an alkyl paint, a latex paint, a polymeric coating, the improvement of using about 5–80 percent by weight of fly ash beads of about 20–300 micron diameter and a specific gravity of up to about 1.25 with a ratio of specific gravity of beads to specific gravity of the liquid coating media in the range of about 0.5–1.5.

Additionally, this invention provides any process for increasing the buoyancy of a vessel by filling a compartment with lightweight media, the improvement of using fly ash beads of about 20–300 micron diameter, a specific gravity of up to about 1.25 and a hydrostatic crush strength of at least 4000 p s.i.g.

In addition, the fly ash beads of this invention can be further separated into fractions having even more uniform gravity and size distribution which exhibit particular uniform characteristics such as color, flow properties, light reflection, high crush resistance or compressive strength by selective flotation using one or more liquids of different specific gravity.

Conventional separation methods such as pneumatic classification and screening techniques can be used for preliminary separation or to further separate the fly ash beads of this invention into fractions for particular applications. The concentration of magnetic and carbonaceous impurities is very low in the lightweight fly ash beads of this invention, but these impurities can be reduced even further by known methods of magnetic separation and chemical treatment.

For applications requiring very high crush resistant particulate filler or substrate, the fly ash beads having a desired minimum crush strength can be separated by hydrostatic methods. A preferred hydrostatic testing method consists of subjecting fly ash beads to a minimum hydrostatic pressure in fluid having a specific gravity slightly higher than the beads being tested so that beads not having the minimum crush resistance value will sink in the fluid. The minimum hydrostatic pressure is reduced and the fly ash beads having the minimum crush resistance are recovered by flotation.

The fly ash beads and polymeric media for compositions of this invention can be combined by any conventional method which uniformly distributes the beads in the media or uniformly coats the media onto the beads. For compositions having high concentrations of fly ash beads, the components can be readily combined by spraying or pouring the polymeric media onto the beads and simply mixing the components. Fluidization or a rolling drum can be used for mixing. Solvent or heat can be used to fluidize the polymeric media. In another method, powdered media can be mixed with the beads. The polymeric media can be fused to the fly ash beads by heating the mixture. Powdered polymeric media can also be mixed with preheated fly ash beads to fuse, mix and coat the beads by simply mixing the two components. Various combinations of these and other known methods can be used to produce compositions of this invention for particular applications.

As used herein structural composition includes compositions which are fluid, semi-solid or solid and are useful as a filler medium for a compartment, as a coating or as a relatively rigid member having volumetric integrity. As used herein, "consisting essentially of" excludes ingredients which interfere with the use of fly ash beads as a particulate filler or substrate but does not exclude inert ingredients or additives which do not substantially interfere with such uses.

Normally solid polymeric media or polymer can be used to make compositions of this invention. Naturally occurring polymers (such as varnish, oil or natural rubber) can be used as well as synthetic polymers (such as ethylenic, acrylic, vinyl, phenolic, epoxy, polyether, silicone, polymers and others) can be used. Preferred classes of polymeric media are thermoplastic polymers, thermal setting polymers, elastomeric polymers and adhesive polymers. One of these polymers in liquid or plastic form or a normally liquid polymer can also be used. Polymeric media which can be easily fluidized by a conventional solvent or fused by heat are especially preferred for economics and ease of handling. Liquid polymeric media having the desired volumetric integrity can be used as a liquid polymeric media or as a readily polymerizable liquid which can be polymerized in place to the desired extent. Polymeric media which can be used for compositions of this invention include polyester polymers, epoxy polymers, vinyl polymers, ethylene polymers, urethane polymers, silicone polymers and polyether polymers. Ethylenic polymers include homopolymers, copolymers, terpolymers and others described by ASTM nomenclature section D1418–67 as EPM, EPDM and others which contain an ethylenic unit. Certain preferred compositions which have exceptionally good appearance, structural properties or electrical properties are those which contain polymers having monomer units derived from the following groups: (I) vinyl chloride, vinyl acetate, styrene, ethylene, propylene, methyl vinyl ether, methacrylate ester, tetrafluoroethylene, and acrylonitrile; (II) acrylic acid, acrylonitrile, maleic anhydride or maleic acid, methacrylic acid and vinyl alcohol; (III) phenol-formaldehyde, urethane, epoxy and urea-formaldehyde; and (IV) butadiene, chloroprene, styrene-butadiene, isoprene and silicone substituted ethylenic monomer. Polymers can be homopolymers, copolymers, or terpolymers of the above monomers taken from one or more groups. Generally, polymers derived from group I are thermoplastic; polymers derived from group II are adhesive polymers; polymers derived from group III are thermosetting; and polymers derived from group IV are elastomeric. Substituted polymers from these classes can be used to provide compositions with particular properties. For instance polyvinyl chloride, polyester, epoxy and phenolic polymers can be used for a rigid inert composition. Whereas, silicone, chloroprene, and vinylidene fluoride can be used for inert flexible or elastomeric composition. Tetrafluoroethylene can be used for inert plastic composition. Polyester polymer is preferred for producing wood-like molded or shaped articles and protective coatings. Epoxy polymer is preferred for a composition having high compressive strength in a molded article or coating which also has excellent electrical characteristics.

Any one of several known methods can be used for forming molded objects using the compositions of this invention. For instance fly ash beads which have been uniformly coated with a thermoplastic polymeric media can be poured into a mold and fused into the desired shape by simply heating, allowing the shape to cool, and removing the mold. To prevent the polymeric media from adhering to the mold, one skilled in the art would normally use a mold lining or mold release agent. For producing shaped forms using thermal setting polymeric media, the mold can be filled with a mixture of powdered polymeric media and fly ash beads prior to fusing the polymer. For simple shapes or coatings the compositions of this invention can be extruded, blow molded, sprayed, or fabricated by any of several conventional methods.

Metallic particles of this invention can be produced by any one of several methods by which particulate substrate can be coated with a metallic film. For instance, a uniform thin metallic coating can be applied to fly ash beads by vapor decomposition of a metallic compound. In another method, preheated fly ash beads can be contacted with a decomposible metallic compound in a fluidized chamber. The critical feature for the metallic particle composition of this invention is that the coating be uniform and thin. The coating can be from about 0.0001–0.1 mm. thick. This coating can be a pure metal, an alloy, or a metallic compound. Metallic compounds which can be applied by known methods such as immersion, decomposition can be applied directly to the fly ash beads. Alternatively, metal coatings can be converted to the desired compound by conversion in situ. By this technique metallic particulate filler or substrate can be produced having certain reactive properties such as a catalytic activity of having certain inert properties such as aluminum oxide coated particles. Preferred metals for these compositions include aluminum, silver, platinum, gold, copper, iron, lead, nickel, silicon, tin, zinc, or alloys thereof having a melting point of less than about 3000° F. Aluminum and gold are preferred for reflective particles.

A preferred composition of this invention consists of a lightweight porous permeable composition produced by sintering the metallic particles described above. These metallic particles can be readily fused together at the metallic coating to produce shapes or aggregate at a much lower temperature (less than 3000° F.) than previously known fly ash particles which were difficult to sinter. These porous structures have utility in many applications as porous reactive surfaces, as filter media, as a porous absorbent media, and as electrically conductive porous shapes.

Insulating compositions of this invention are produced by combining fly ash beads with a solid insulation binder or a fluid insulating media. The compositions using a fluid media provide excellent electrical, thermal, and moisture insulating properties at much lower cost than insulating fluids alone. In addition, these fluid insulating compositions can be fabricated to provide the fluid parameters desired. For instance, as a replacement for transformer oil the fluid insulating composition of this invention can have a relatively high concentration of fly ash beads to reduce the expense and heat capacity of the fluid, yet provide an insulating media which flows readily, has excellent dielectric properties, and tends to reduce fluid leakage. As an insulator for electrical cable, these fluid compositions can be fabricated to provide excellent insulating properties at low cost which does not readily flow or leak out of the cable sheath. Furthermore by using a liquid polymeric media which can be readily polymerized to a desired plastic or rigid condition the fluid insulating compositions of this invention can be used to provide inexpensive insulating barriers for electrical cable and other components which can be polymerized in situ to provide a flexible, leak-proof barrier in inaccessible intricately shaped areas.

Preferred fluid insulating compositions of this invention contain about 5–80 weight percent beads and the fluid insulating media. For low flow resistance the bead concentration of these compositions should be below about 60 percent by weight. For compositions where flow resistance is not critical or where high flow resistance is desired, the bead concentration should be above about 60 percent and as near 80 percent as the initial application method will allow. For certain applications such as spraying or injecting an insulating composition, temporary fluidizing agents or solvents can be used to reduce flow resistance of the composition.

Preferred insulating fluid media for these compositions include hydrocarbon, synthetic oils and substituted oils such as mineral oil, silicone oil, halogenated hydrocarbon, and polymeric oils. These fluids can be used over a broad viscosity range depending upon the application and with or without other additives.

A preferred fluid insulating composition embodies the fly ash beads of this invention in one of the above insulating fluids wherein the specific gravity of the insulating beads closely matches the specific gravity of the insulating fluid. By maintaining the ratio of specific gravity of the beads to the specific gravity of the oil in the range of about 0.5–1.5, the tendency to separate is not a problem for medium viscosity insulating fluids. For low viscosity fluids, specific gravity ratios should be in the range from about 0.8–1.2. Matching the viscosity of the fluid media and specific gravity of the fly ash beads provides a fluid composition with excellent insulating properties and flow properties which closely match the fluid media at low cost. In such compositions, the maximum operating temperature is limited only by the fluid insulating media since the fly ash beads have an operating limit in excess of about 2000° F.

In liquid coating compositions such as paints and polymeric coatings, this invention provides the improvement of using about 5–80 percent by weight fly ash beads for low cost, increased volume, and increased covering power. A particular type of bead and loading can be used for particular coating properties. For instance a high bead loading of large diameter beads can be used to reduce running or to impart a satin texture to a coating. High crush resistant fly ash beads can be used to produce a wear-resistant coating. Metallic coated beads can be used to produce a reflective surface coating.

The coating compositions of this invention can be produced by any of several well-known methods. The simplest being mixing the desired type of fly ash beads into the coating composition as the final step in preparation of the coating. Such compositions can be applied in any conventional manner. The coating compositions of this invention can also be produced by applying the liquid coating media and the fly ash beads separately. By this method composite coatings can be produced for special effects such as a tinted reflective surface. Preferred liquid coating media for these compositions include alkyl paints, latex paints, polymeric coatings, and varnishes.

By maintaining the ratio of bead specific gravity to liquid media specific gravity in a narrow range compositions of this invention can be stored for extended periods without separation of the two components. Fly ash beads can be separated using various liquids into fractions having a narrow specific gravity range from about 1.5 to below about 0.6. Preferred fly ash bead fractions have specific gravity below about 1.25. These fractions can be used in most liquid compositions of this invention to maintain the ratio of specific gravity of the beads to the specific gravity of the liquid media in the range of about 0.5–1.5. As used herein, specific gravity is determined at the temperature of use or separation of the liquid or beads with distilled water assigned a density of 1.0. Thus, the specific gravity will vary with temperature of application and will be a range for a bead fraction. For preferred liquid composition of this invention in which the fly ash beads do not significantly separate for periods of up to about several months the ratio of specific gravities should be in the range of about 0.8–1.2. Since the fly ash beads of these compositions are relatively inert, the liquid coating compositions can contain other additives.

The fly ash beads of this invention provides a method for increasing bouyancy of a vessel by filling a compartment of a vessel with fly ash beads of about 20–300 micron diameter, a specific gravity of up to about 1.0 and hydrostatic crush strength of at least about 4000 p.s.i.g. For this application preferred fly ash beads have a specific gravity of less than about 0.6. The fly ash beads can be used as a particulate filler for the vessel compartments and retained in place by the compartment boundaries. They can be incorporated in a liquid media or a polymeric binder.

By incorporating fly ash beads in a solid or semi-solid polymeric binder, such as an ethylenic polymer or a urethane polymer, compositions of this invention can be fabricated into insulating, bouyant, and shock-absorbing shapes. Such compositions can be molded into shapes to fill spaces in an apparatus, into layers which can be adhered to a surface or into aggregates which can be used to fill a compartment. These compositions are prepared by mixing up to about 80 percent by weight of washed sized beads with one or a combination of liquid components of the polymeric binder. Since the beads have good crush resistance, liquid polymer and beads can be applied by spraying or pumping. These compositions can use fly ash beads as the principal filler for adding insulating cells or other fillers, insulating means and additives can be used. For example, the polymer media can include foaming ingredients such as a typical polyurethane foam which can consist of diol, polyol, polyisocyanate, surfactant, catalyst, supplemental blowing agent, zinc oxide filler, and other additives. In such a composition water produced during the polymerization and supplemental blowing agent creates gas cells which improve shock absorbency and reduce polymer density. Fly ash beads in such foams also serve as a reinforcing filler as well as to reduce polymer density and increase insulating properties. For these compositions elastomeric polymers are preferred but plastic and rigid polymers can be used.

A preferred composition contains a tone filler and polymer modifier. This composition is preferred for forming shaped or molded structural articles, especially those of high strength having the texture, color and workability of wood. This composition can be readily formed, cast and set into most desired shaped. For example, synthetic wood as sheets, strips or cast forms can be rapidly produced using this composition. The composition contains 20–95 percent by weight polymer, with 5–80 percent by weight select fly ash beads (i.e., fly ash beads produced by the selective separation of this invention having the desired uniform properties of color, chemical inertness and strength), about 0.1–4.0 percent, preferably about 2–30 percent, by weight tone filler and, optionally, about 0–10 preferably about 0.1–10 percent by weight, polymer modifier. Tone filler as used herein refers to filler of natural or synthetic material in particulate or fiber form, preferably finely divided, which serves to modify the color, texture or workability of the filled polymer composition. Such tone fillers include nut shell particles; bagasse; seed hull; straw; wood fiber, natural fiber such as cotton or flax; pigments such as zinc oxide; titanium oxide; carbon black; clay; and colored pigment. Polymer modifier includes oil, catalyst, plasticizer, extender, and polymerization prohibitor. This composition is illustrated by Example 3.

The flotation process for recovering the fly ash beads of this invention having a relatively narrow size, specific gravity, and crush resistance distribution consists essentially of (1) mixing fly ash particles with a first liquid, having a specific gravity of about 1.0, allowing the particles to move according to the differences in specific gravity, and separating the lightweight particles that tend to rise from the heavier particles, and (2) mixing lightweight particles of step (1) with a second liquid having a specific gravity of less than about 1.0, allowing the particles to move according to the differences in specific gravity, and separating the lightweight particles that tend to rise from the heavier particles. In the preferred embodiment of this process at least three flotation liquids are used; one liquid having a specific gravity of about 1.0; one liquid having a specific gravity of about 0.8; and one liquid having a specific gravity of about 0.6. This preferred flotation process using at least three liquids can be conducted sequentially with each liquid in a separate container. Alternatively, the liquids can be in one container with adjacent liquids being immiscible and each fly ash bead component being recovered near a liquid layer interface.

In a third variation of the above process, a single compressible liquid having a specific gravity which can be adjusted by pressure to the desired value in the range of about 1.0–0.6 can be used. This method can be used for a batch process at a given specific gravity level or continuously with several separating steps.

Preferred liquids for separating beads by flotation include salt water, heavy oil and substituted oils for gravities above about 1.0; water, hydrocarbon oils and solvents, substituted hydrocarbons and hydrocarbon compounds for specific gravities below about 1.0. Low volatility compounds are preferred for simplicity. Examples of such compounds include carbon tetrachloride, chloroethylene, acetone, diphenylether, methylethyl ketone, fluorotrichlorethane, hexane, benzene, kerosene, silicone oil, lube oil, residual oil, and bunker oil. Solvents, substituted compounds, acids and alkali can be used as the flotation media or to adjust the specific gravity. Additives such as acid and other compounds can be used to clean or coat the beads in the flotation process.

The invention can be used and the advantages demonstrated by the following illustrative examples. Ratios percentages and parts are by weight unless otherwise indicated.

EXAMPLE 1

Several samples of fly ash beads having a density of about 1.0 or less are prepared by water flotation. For each sample about 2000–3000 parts of fly ash are mixed with water at about room temperature. About 100 parts of fly ash beads are recovered floating on top of the water for each sample.

One hundred part samples of each type of fly ash bead recovered by water flotation are air dried at room temperature and separated by screening. Each sample is screened using a set of six sieves and a Tyler Ro-Tap® apparatus. The fly ash beads are separated by particle size into seven fractions. Each fraction is noted by a characteristic color. The smaller beads tend to be whiter which is preferred for furniture coating and decorative applications.

Samples prepared by such a procedure yield data as in Table I.

EXAMPLE 2

A fly ash bead sample recovered by water flotation as in Example 1 is screened using six Tyler Standard Screens into six fractions. Each fraction is then separated by hexane and acetone flotation into components having densities in one of the following ranges: (1) less than about 0.66 g./cc., (2) about 0.66–0.8 g./cc., and (3) about 0.8–1.0 g./cc. For this flotation each component is mixed with hexane.

Beads that sink in hexane are mixed with acetone. Each component is dried and weighed yielding the data in Table II. These data indicate that beads above about 100 micron diameter tend to have lower density and beads between about 50–100 micron diameter have a mean density in the range of about 0.66–0.8.

EXAMPLE 3

Fly ash beads obtained by water flotation and screening as described in Example 1 and comparable size glass microspheres are prepared in a commercial polyester formulation according to Table III.

Samples of these formulations are fabricated into specimen having a one-inch square cross-section. These samples are cured at room temperature for 18 hours. Compressive deformation and failure are determined on a standard Instron machine at a head rate of 0.1 inch per minute. Data from these tests are given in Table IV. These data indicate that a polyester formulation containing fly ash beads has a higher compressive strength and value at failure than a polyester formulation having a comparable volume of glass microsphere filler.

Nails are driven into samples prepared as described above. The nails penetrate both glass filled and fly ash bead filled samples in a manner similar to wood. The nails hold firmly and the samples do not crack.

EXAMPLE 4

Samples of glass microspheres, urea-formaldehyde plastic microspheres supplied by Emerson and Cumings Company and fly ash bead filler in an epoxy formulation are prepared in a manner similar to Example 2, having the compositions set forth in Table V–A.

These formulations are fabricated into 1" x 1" x ½" samples and cured at 80° F. for 24 hours. Standard electrical tests are conducted on these samples by a method similar to ASTM method D150–70. Electrical data for hese samples are represented by Samples A–D in Table VI.

These data indicate that the fly ash bead filled epoxy composition have lower capacitance, power dissipation and leakage with nearly constant values over the frequency and voltage ranges than epoxy filled with glass or plastic beads. Fly ash filled epoxy even has lower capacitance and leakage than pure epoxy composition.

EXAMPLE 5

Fluid insulation compositions are prepared by mixing polyethylene fluid with glass and fly ash bead filler according to the formulations in Table V–B. The electrical propertes of these compositions are determined as in Example 4. Data from these tests are represented by Samples E–I in Table VI.

Data from the electrical tests indicate that the fly ash bead filled fluid composition has low capacitance, dissipation and leakage values which are practically constant over the frequency and voltage ranges used. Fly ash bead filled compositions have lower capacitance and dissipation values than the glass filled compositions.

EXAMPLE 6

Epoxy formulations are prepared as in Example 4 using fly ash bead, glass microspheres, and carbon microsphere filler. These formulations were fabricated into test specimen as in Example 3 and compressive strength values were conducted as in Example 3 for each specimen. Data from these tests are given in Table VII.

The compressive strength test data indicate that for fly ash bead-epoxy compositions compressive strength is only about 20-23 percent lower for samples having up to about 40 percent filler as compared to values over 80 percent lower for glass filler for 40 percent filler and values over 50 percent lower for carbon filler for only 20 percent filler.

void volume is calculated for each type of particulate filler. Crush resistance data are given in Table VIII.

TABLE I.—FLY ASH BEAD COMPONENTS

| Type of fly ash | A | B |
|---|---|---|
| Average density, g./cc. | 0.54 | 0.68 |
| Density distribution wt. percent: | | |
| 1.0–0.79 | 18 | 35 |
| 0.79–0.66 | 27 | 34 |
| 0.66 | 55 | 31 |
| Average particle size microns ($\mu$) | 115 | 100 |
| Particle size distribution | 33 | 4 |
| Wt. percent +80 mesh (Tyler screen) (>177$\mu$) | 1.8 | 1.0 |
| −80 +100 (149$\mu$ to 177$\mu$) | 35.0 | 14.0 |
| −100 +120 (125$\mu$ to 149$\mu$) | 14.7 | 15.0 |
| −120 +140 (105$\mu$ to 125$\mu$) | 19.9 | 18.0 |
| −140 +170 (88$\mu$ to 105$\mu$) | 5.6 | 9.0 |
| −170 +230 (63$\mu$ to 88$\mu$) | 13.0 | 19.0 |
| −230 (<63$\mu$) | 10.0 | 24.0 |
| Total parts | 100.0 | 100.0 |

NOTE.—A = Fly ash bead from Appalachian Power Company separated by water flotation; B = Fly ash bead from Toledo Edison Company separated by water flotation.

TABLE II

| Type of fly ash bead | Mesh, Tyler std. | Particle size, microns | Dist., percent | Percent of fraction | | |
|---|---|---|---|---|---|---|
| | | | | Floated hexane, 0.66 | Sank hexane, floated ace., 0.66–0.8 | Sank in acetone, 0.8–1.0 |
| B | −45 +100 | 149–323 | 36.76 | 68.30 | 18.27 | 13.43 |
| | −100 +120 | 125–149 | 14.71 | 60.21 | 24.01 | 15.78 |
| | −120 +140 | 105–125 | 19.94 | 54.19 | 27.30 | 18.51 |
| | −140 +170 | 88–105 | 5.59 | 54.17 | 26.39 | 19.44 |
| | −170 +230 | 63–88 | 12.97 | 49.40 | 32.31 | 18.29 |
| | −230 | 63 | 10.03 | 42.60 | 35.08 | 22.32 |
| Total | | | 100.00 | | | |
| Average | | | | 54.81 | 27.22 | 17.96 |

NOTE.—Sp. gr. acetone = 0.79; Sp. gr. hexane = 0.66.

EXAMPLE 7

Crush strength of glass microspheres, plastic microspheres and fly ash beads is determined using a 100 part sample for each type of filler. The fly ash beads are obtained by water flotation as in Example 1.

Each sample is subjected to hydrostatic pressure in a 50 cc. high-pressure cell using compressed distilled water. The water is compressed with a Ruska pump. The pressure is cycled several times from a 50 p.s.i.g. threshold pressure to each test pressure and back to threshold pressure while filler crushing is monitored acoustically using a microphone and amplifier. After cycling at each test pressure, the filler particles crushed is determined by the change in volume of water in the test cell and the densities of the beads before and after crushing. Average internal

TABLE III.—POLYESTER FORMULATION

| Component (parts by weight) | Glass filler | Fly ash beads |
|---|---|---|
| Laminac® polyester resin, EPX-279-1 [1] | 100 | 100 |
| Styrene monomer | 25 | 25 |
| Pecan shell flour | 30 | 30 |
| Glass microspheres IG-101 [2] | 15 | |
| Fly ash beads [3] | | 30 |
| Titanium dioxide | 1.5 | 1.5 |
| Laminac® promoter (dimethyl aniline) [1] | 0.5 | 0.5 |
| 6% cobalt promoter | 1 | 1 |
| MEK peroxide initiator | 1 | 1 |
| Total parts | 174 | 189 |
| Weight/gallon, lbs | 7.6 | |
| Sp. gr. | 0.96 | |
| Linear shrinkage, percent | 4 | |
| Gel time at 77° F., min | 4–6 | |
| Demolding time, min | 7–10 | |

[1] From American Cyanamid Company.
[2] Industrial grade glass, Microballoons® from Emerson and Cuming Company, Canton, Mass. having densities in the range 0.23–0.37 g./cc.
[3] Type A: −80 mesh, Table I, having density of about 0.6 g./cc.

TABLE IV.—COMPRESSION TESTS OF POLYESTER FORMULATIONS

| Sample | Formulation | Sample size, in. | Bead type filler | Applied force (p.s.i.) at percent deformation | | | | Sample density | Comments |
|---|---|---|---|---|---|---|---|---|---|
| | | | | 10% | 20% | 25% | 30% | | |
| 1 | A | 1 x 1 x 1 | Glass | 450 | 650 | | 750 | 0.9800 | Cracked at 50%. |
| 2 | A | 1 x 1 x 1 | do | 425 | 575 | | 700 | 0.9360 | Did not crack. |
| 3 | B | 1 x 1 x 1 | do | 320 | 460 | | 575 | 0.9249 | Do. |
| 4 | B | 1 x 1 x 1 | do | 330 | 460 | | 575 | 0.9352 | Do. |
| Average | | | | 381 | 535 | | 650 | 0.944 | |
| 5 | C | 1 x 1 x 1 | Fly ash | 300 | 700 | | 960 | | Cracked at over 30%. |
| 6 | C | 1 x 1 x 1 | do | 260 | 630 | | 900 | 1.1339 | Did not crack. |
| 7 | D | 1 x 1 x 1 | do | 350 | 770 | | 1,000 | | Do. |
| 8 | D | 1 x 1 x 1 | do | 325 | 750 | | 1,070 | 1.0985 | Cracked at over 30%. |
| Average | | | | 310 | 713 | | 1,008 | 1.116 | |
| 9 | A | 1 x 1 x 1 | Glass | 400 | 575 | 625 | 670 | | Did not crack. |
| 10 | B | 1 x 1 x 1 | do | 270 | 440 | 480 | 530 | | Do. |
| Average | | | | 335 | 508 | 553 | 600 | | |
| 11 | C | 1 x 1 x 2 | Fly ash | 400 | 760 | 900 | 250 | | Cracked near 30%. |
| 12 | D | 1 x 1 x 2 | do | 460 | 850 | 985 | 550 | | Do. |
| Average | | | | 430 | 805 | 943 | 400 | | |

TABLE V-A
Epoxy formulation

| Component (by weight) | A | B | C | D |
|---|---|---|---|---|
| Epoxy [4] | 100 | 77 | 77 | 65 |
| Glass microspheres (IG-101[1]) | | 23 | | |
| Plastic microspheres UF-O [2] | | | 23 | |
| Fly ash beads [3] | | | | 45 |
| Total parts | 100 | 100 | 100 | 100 |

[1] Emerson and Cumings Co.
[2] Urea-formaldehyde beads supplied by [1].
[3] Type A, −80 mesh from Table I.
[4] Shell Epon 828 with type Z hardener—an epichlorohydrin and bisphenol-A condensation resin.

TABLE V-B
Polyethylene fluid formulations

| Component (by weight) | E | F | G | H | I |
|---|---|---|---|---|---|
| Polyethylene fluid 80-446 [1] | 100 | 80 | 80 | 70 | 60 |
| Glass microspheres [2] | | 20 | | 30 | |
| Fly ash beads [3] | | | 20 | | 40 |
| Total | 100 | 100 | 100 | 100 | 100 |

[1] Polyethylene fluid, type 80-446 from Dow Chemical Company.
[2] FT-102, Emerson and Cumings Co.
[3] Type A, −80 mesh from Table I, obtained by hexane flotation.

TABLE VI.—ELECTRICAL PROPERTIES OF FORMULATIONS

| Formulation | Capacitance, pf. | | | Dissipation factor Q | | | Leakage (micro amps) | | |
|---|---|---|---|---|---|---|---|---|---|
| | 40 Hz. | 400 Hz. | 4,000 Hz. | 40 Hz. | 400 Hz. | 4,000 Hz. | 1,000 v. | 1,500 v. | 2,000 v. |
| A (Epoxy) [1] | 10.25 | 10.10 | 9.85 | 0.005 | 0.007 | 0.04 | 0.1 | 0.5 | 0.1 |
| B (Epoxy) [1] | 8.75 | 7.35 | 7.07 | 0.22 | 0.08 | 0.08 | 2.9 | 4.5 | 6.9 |
| C (Epoxy) [1] | 21.03 | 12.75 | 8.74 | 0.34 | 0.03 | 0.02 | 0.0 | 0.0 | 0.01 |
| D (Epoxy) [1] | 6.68 | 6.54 | 6.38 | 0.01 | 0.02 | 0.06 | 0.0 | 0.0 | 0.0 |
| E (Polyet) [2] | 5.33 | 5.06 | 4.89 | 0.038 | 0.034 | 0.060 | 0 | 0 | 0 |
| F (Polyet) [2] | 6.60 | 5.48 | 5.09 | 0.128 | 0.072 | 0.076 | 0 | 0 | 0 |
| G (Polyet) [2] | 5.55 | 5.25 | 5.03 | 0.042 | 0.038 | 0.060 | 0 | 0 | 0 |
| H (Polyet) [2] | 5.97 | 5.15 | 4.80 | 0.156 | 0.076 | 0.076 | 0 | 0 | 0 |
| I (Polyet) [2] | 5.30 | 5.02 | 4.99 | 0.040 | 0.039 | 0.064 | 0 | 0 | 0 |

[1] See Table V-A.   [2] See Table V-B.

TABLE VII.—COMPRESSIVE STRENGTH IN EPOXY FORMULATIONS[1]

| Filler Weight percent: | Compressive strength ($10^3$ p.s.i.) | | | |
|---|---|---|---|---|
| | A [2] | B [3] | Glass microspheres [4] | Carbon particles [5] |
| 0 | 18.8 | 18.8 | 18.8 | 18.8 |
| 10 | 18.0 | 17.0 | 12.5 | 15.0 |
| 20 | 17.0 | 16.2 | 11.4 | 8.6 |
| 30 | 16.2 | 15.4 | 7.5 | |
| 40 | 15.0 | 14.5 | 2.5 | |

[1] Same as Table V-A.
[2] Same as type A, Table I.
[3] Same as type B, Table I.
[4] Same as Table III.
[5] Carbon microspheres, equivalent to Carbo-spheres from General Technologies Corporation, having 40 micro-average diameter and density of about 0.13 g./cc.

TABLE VIII.—HYDROSTATIC CRUSH RESISTANCE

| | Percent crushed cumulative | | |
|---|---|---|---|
| | Glass microspheres | Plastic microspheres [1] | Fly ash beads |
| Hydrostatic pressure, p.s.i.g.: | | | |
| 1,000 | 40.07 | 24.57 | 22.87 |
| 2,000 | 62.4 | 38.29 | 28.77 |
| 4,000 | 76.87 | 50.41 | 37.15 |
| 6,000 | 81.93 | 53.70 | 42.85 |
| 8,000 | 84.74 | 55.49 | 48.22 |
| 10,000 | 84.74 | 55.49 | 51.20 |
| Density, g./cc | 0.330 | 0.240 | 0.678 |
| Internal void volume, cc./gm | 2.58 | 3.49 | 1.02 |

[1] Hollow urea-formaldehyde beads, same as in Example 4.

We claim:

1. A composition consisting essentially of about 5–80 percent by weight fly ash beads of about 20–300 micron diameter and a specific gravity of up to about 1.25 in a polymeric media selected from an epoxy polymer, a polyester polymer, a polyurethane polymer, a polyvinyl chloride polymer, a polyimide polymer, a varnish, an ethylenic polymer, an ethylene-propylene copolymer, an ethylene-propylene-diene terpolymer, a silicone polymer, a phenolic polymer or a combination thereof.

2. In a liquid polymeric coating, the improvement of using about 5–80 percent by weight fly ash beads of about 20–300 micron diameter and a specific gravity of up to about 1.25 with the ratio of specific gravity of said beads to specific gravity of said liquid polymeric coating media in the range of about 0.5–1.5.

3. In a liquid polymeric coating composition of Claim 2, the improvement of using about 5–80 percent by weight fly ash beads of about 20–300 micron diameter and a specific gravity of up to about 1.25, with the ratio of specific gravity of said beads to specific gravity of said liquid polymeric coating media in the range of about 0.5–1.5, with said fly ash beads bearing a metallic coating having a thickness from about 0.001–0.1 millimeters.

References Cited
UNITED STATES PATENTS
2,150,917  3/1939  Foulke et al. _____ 209—172

FOREIGN PATENTS
2,004,223  8/1970  Germany _____ 106—Dig. 1
2,036,626  12/1970  France _____ 106—Dig. 1

OTHER REFERENCES
Chemical Abstracts, vol. 74, 1971, 43165c.

ALLAN LIEBERMAN, Primary Examiner
E. S. PARR, Assistant Examiner

U.S. Cl. X.R.
106—Digest 1, 308 B, 288 B